United States Patent [19]
Senski

[11] Patent Number: 5,442,667
[45] Date of Patent: Aug. 15, 1995

[54] REACTOR PRESSURE VESSEL WITH LIMITED FAILURE ZONES

[75] Inventor: Gregor Senski, Nürnberg, Germany

[73] Assignee: Siemens Aktiengesellschaft, Munich, Germany

[21] Appl. No.: 212,979

[22] Filed: Mar. 15, 1994

[30] Foreign Application Priority Data

Mar. 15, 1993 [DE] Germany ............... 43 08 207.6

[51] Int. Cl.⁶ .............................................. G21C 13/08
[52] U.S. Cl. ................................................. 376/294
[58] Field of Search ............... 376/294; 220/581, 583, 220/585, 586, 587

[56] References Cited

U.S. PATENT DOCUMENTS

| | | | |
|---|---|---|---|
| 4,097,332 | 6/1978 | Gibbons et al. | 376/364 |
| 4,587,086 | 5/1986 | Ulrych | 376/294 |
| 4,793,964 | 12/1988 | Fajeau | 376/294 |
| 4,892,702 | 1/1990 | Vignes | 376/294 |
| 5,263,066 | 11/1993 | Szabo et al. | 376/280 |

FOREIGN PATENT DOCUMENTS

| | | |
|---|---|---|
| 0044255 | 1/1982 | European Pat. Off. . |
| 2503436 | 10/1982 | France . |
| 1475662 | 3/1969 | Germany . |
| 2636743 | 11/1977 | Germany . |
| 2754462 | 12/1978 | Germany . |
| 4237245 | 6/1993 | Germany . |
| 1123980 | 12/1965 | United Kingdom . |
| 2080436 | 2/1982 | United Kingdom . |

*Primary Examiner*—Daniel D. Wasil
*Attorney, Agent, or Firm*—Herbert L. Lerner; Laurence A. Greenberg

[57] ABSTRACT

A reactor pressure vessel for a nuclear reactor includes an upper part and a lower part. At least the lower part has first subregions with a lesser wall thickness and second subregions with a greater wall thickness. The lesser wall thickness is selected for a rated operation. The first subregions are formed by recesses in the outer surface of the wall.

12 Claims, 1 Drawing Sheet

REACTOR PRESSURE VESSEL WITH LIMITED FAILURE ZONES

BACKGROUND OF THE INVENTION

1. Field of the Invention

The invention relates to a reactor pressure vessel for a nuclear reactor.

Such a reactor pressure vessel typically includes a lower part which is constructed as a dome, and an adjoining upper part which is constructed cylindrically. As a rule, the reactor pressure vessel is restrained by so-called fastening claws. Today, the raw material used is typically ferritic steel material which was developed for that special application and is known by the designation 20MnMoNi55. In operation, the reactor pressure vessel is at a high internal pressure, which can amount to as much as approximately 170 bar. In order to withstand that pressure, a lower part is constructed with a wall thickness of approximately 15 cm and an upper part with a wall thickness of approximately 25 cm. In the nuclear power plant, the reactor pressure vessel is surrounded by a reactor protection building (containment), which is substantially formed of concrete.

Heretofore, the conventional thinking on safety considerations assumed that there was no need to fear reactor pressure vessel failure, because of the materials and dimensions selected. However, more-intensive safety studies of nuclear energy utilization have also considered the possibility, however unlikely, of a "failure" of a reactor pressure vessel. In particular, one new reactor type, the European Pressurized water Reactor or EPR, is based on such considerations. In contrast to the earlier philosophy of safety, in that reactor type the possibility of a core meltdown accident, a so-called MCA (Maximum Credible Accident), is not rejected out of hand. Some thought has also been directed to whether steam explosions might not occur during a core meltdown, and whether in such a critical phase, suddenly produced water vapor might not cause the pressure vessel to burst. There is no question that control must be gained over such accidents, however theoretical they may be.

The point of departure of theoretical studies is this: in an overload of a thermal nature (overheating) or of a mechanical nature (overpressure), and in particular in the event of a core meltdown accident, a crack that is propagated at high speed could occur locally in the homogeneous wall of the reactor pressure vessel. The crack can then spread, out of control, to relatively large regions. The possibility exists that a relatively large region could break up, for instance the entire dome in the lower part. Something similar could happen if the lower part of the reactor pressure vessel fills with core melt, given the high internal pressure. If a part that large were to break up, a reaction surge would occur within far less then one second, and in that surge the upper part of the reactor pressure vessel could be torn from the fastening claws and be spun like a rocket upward against the inner wall of the containment. The containment must withstand such an impact. The containment must also offer sufficient resistance if the reactor pressure vessel "explodes", or in other words breaks apart into a number of relatively large or small pieces. Even with relatively heavy concrete construction, it is difficult to absorb such explosion-like effects.

SUMMARY OF THE INVENTION

It is accordingly an object of the invention to provide a reactor pressure vessel for a nuclear reactor with limited failure zones, which overcomes the hereinafore-mentioned disadvantages of the heretofore-known devices of this general type and which has further increased safety. In other words, the safety of the nuclear power plant should be assured, even in the unlikely event of a crack in the vessel wall due to thermal and/or mechanical overload (overheating, overpressure). This is intended to apply especially in the event of a core meltdown in the reactor pressure vessel.

The invention is based on the concept that a spontaneous global failure of the reactor pressure vessel must be averted or limited. This refers in particular to a breakup of a relatively large part, for instance of the entire lower dome-shaped part, in the vessel wall. If this is successfully averted or limited, then in the event of a credible accident, a reactor surge high enough to be uncontrollable cannot occur. In other words, in that case the forces of reaction acting upon the restraint or fastening (fastening claws) of the reactor pressure vessel can be controlled constructively. The invention is also based on the concept that the reaction surge can be kept small by lengthening the time over which a cracking event may proceed, however unlikely.

With the foregoing and other objects in view there is provided, in accordance with the invention, a reactor pressure vessel for a nuclear reactor, comprising an upper part and a lower part, at least the lower part having first subregions with a lesser wall thickness and second subregions with a greater wall thickness, the lesser wall thickness being selected for a rated operation.

In accordance with another feature of the invention, the first subregions with the lesser wall thickness are recesses in the outer surface of at least the lower part, which is a comparatively simple construction structurally. Experience shows that the wall of a reactor vessel can be machined more easily from outside than from inside. Moreover and especially significantly, the ease of checking the reactor pressure vessel from outside is assured, because then the inside region can have smooth surfaces. Moreover, fixtures on the inside for draining a hypothetically occurring core melt can then be dispensed with.

In accordance with a further feature of the invention, the recesses are rounded on the inside and in particular are dome-shaped.

In accordance with an added feature of the invention, the recesses have a symmetrically configuration, when viewed in the direction toward the outer surface of the reactor pressure vessel, which is also advantageous for production purposes. Accordingly they may be round, elliptical or hexagonal in form, for instance.

With respect to the number and size of the recesses, there is a wide range of variation, depending on the intended application and the credible accident. However, in accordance with an additional feature of the invention, for production purposes, all of the subregions or recesses are of the same size.

In accordance with yet another feature of the invention, with respect to number, observations have shown that depending on the size, between 8 and 30 first subregions or recesses in the lower part of the reactor pressure vessel are adequate.

In accordance with yet a further feature of the invention, the first subregions and [in particular the recesses on the outer surface are distributed symmetrically.

In accordance with yet an added feature of the invention, in a reactor pressure vessel, the upper part is preferably cylindrically constructed and the first subregions having the lesser wall thickness are provided in the upper part of the reactor pressure vessel.

In accordance with yet an additional feature of the invention, the upper and lower parts are formed of a ferritic steel wall material, the lesser wall thickness in the first subregions is approximately 15 cm, and the greater wall thickness in the second subregions is approximately 25 cm.

In accordance with again another feature of the invention, each of the recesses has a diameter being approximately in a range of from 0.5 to 2 m.

In accordance with a concomitant feature of the invention, the upper and lower parts have an outer surface, and there is provided a ring on the outer surface between the upper and lower parts.

Other features which are considered as characteristic for the invention are set forth in the appended claims.

Although the invention is illustrated and described herein as embodied in a reactor pressure vessel with limited failure zones, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
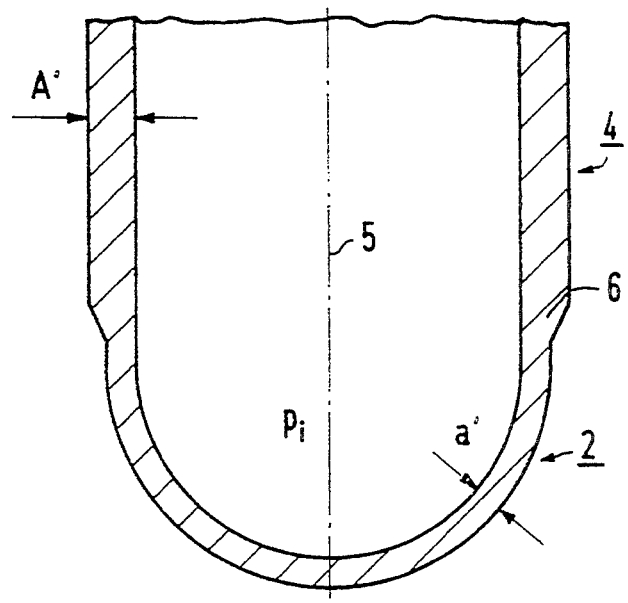
FIG. 1 is a fragmentary, diagrammatic, longitudinal-sectional view of a reactor pressure vessel of the prior art.

Referring now to the figures of the drawing in detail and first, particularly, to FIG. 1 thereof, there is seen a conventional reactor pressure vessel for a nuclear power plant which has a spherical lower part 2 and a cylindrical upper 4. A line of symmetry is shown at reference numeral 5. Both parts 2, 4 have walls that are substantially smooth, both inside and out. The parts 2, 4 are intimately joined together in the region of a transition point 6. Today, the parts 2, 4 are usually made of a ferritic steel material. The lower part 2 has a relatively thin wall with a thickness a'. The thickness a' is selected for a rated internal pressure $p_i$, which may amount to 160 to 170 bar, for instance. A wall thickness A' of the cylindrical upper part 4 is greater by a factor of approximately 2. It too is selected for the rated internal pressure $P_i$, plus a safety margin. Typical values are a'=15 cm and A'=25 cm. It is significant to note that until now, the walls of the parts 2, 4 have been constructed homogeneously, and each with a uniform thickness.

Figure 2:
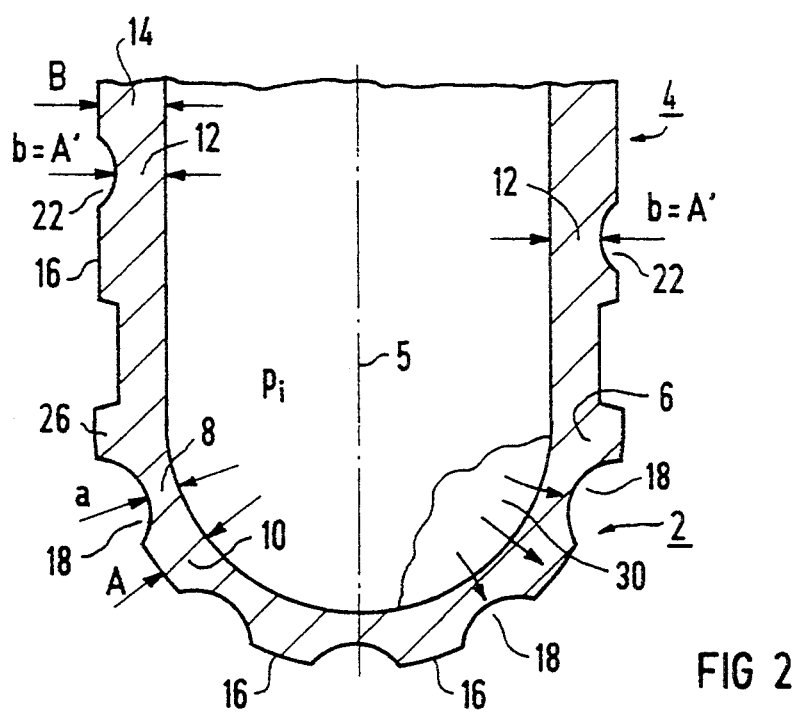
FIG. 2 is a view similar to FIG. 1 of a reactor pressure vessel according to the invention, with recesses in lower and upper parts.

The reactor pressure vessel of FIG. 2 is a departure from the structure of FIG. 1. As will be described in further detail below, this pressure vessel includes limited failure zones or regions in the lower part 2 and optionally in the upper part 4 as well.

FIG. 2 shows a reactor pressure vessel according to the invention, which is intended for a pressurized water reactor and which again has a dome-shaped lower part 2 and a cylindrical upper part 4. The transition region is again indicated by reference numeral 6. The lower part 2 has first subregions 8 with a lesser wall thickness a and second subregions 10 with a greater wall thickness A. The lesser wall thickness a is selected in this case for rated operation of the reactor pressure vessel at the internal pressure $P_i$. Correspondingly, in the upper part 4, the reactor pressure vessel has first subregions 12 of lesser wall thickness b and second subregions 14 of greater wall thickness B. Once again, the lesser wall thickness b is selected for rated operation. In particular, the wall thickness a may be equal to the wall thickness a' (that is a=a'), and the wall thickness b may be equal to the wall thickness A' (that is b=A').

The first subregions 8 in the lower part 2 are formed by recesses 18 in the outer surface 16. Correspondingly, the subregions 12 of lesser wall thickness b in the upper part 4 are formed by recesses 22 in the outer surface 16. The recesses 18, 22 are rounded on the inside, and in particular have a dome-shaped construction. The recesses 18, 22 have a symmetrical configuration, as seen in the direction towards the outer surface 16. They can accordingly be round, elliptical or hexagonal in appearance. All of the recesses 18, and therefore all of the first subregions 8, in this case are of the same size. Correspondingly, all of the recesses 22, and therefore all of the first subregions 12, are of the same size.

A ferritic steel material is also preferentially used as the wall material in this case in the lower and upper parts 2, 4. The least wall thickness a in the aforementioned first subregions 8 in the lower part 2 is approximately 15 cm, and the remaining wall thickness A in this case is approximately 25 or more. In the upper part, the least wall thickness b in the aforementioned first subregions 12 is approximately 25 cm, and the remaining wall thickness B is more than 25 cm. In this embodiment example, b=A' has accordingly been chosen. The diameter of each of the recesses 18, 22 is approximately in the range from 0.5 to 2 m.

In the transition region 6 between the lower part 2 and the upper part 4, an additional annular wall thickening or ring 26 is also provided or machined onto the outer surface 16 of the reactor pressure vessel. This ring 26 is additionally intended to serve as a safety measure and to absolutely prevent the spherical lower part 2 from tearing away from the upper part 4.

In the lower part 2, at least eight first subregions 8 of lesser wall thickness a are provided in this case. If the number of recesses 18 is increased from 8 to 15, then one can still assume that the reactor pressure vessel can be tested relatively easily from the outside by the so-called recurrent testing method. If the number of first subregions 8 is increased even further, for instance to 30, then the theoretically assumed accident scenario in this case becomes even easier to control.

The first subregions 8 having the lesser wall thickness a are preferably symmetrically distributed in the lower part 2. This is expressed by the line of symmetry 5 shown in the drawing.

It is important above all that the first subregions 8 which have a lesser wall thickness a but are adapted to the rated operation, be provided in the dome-shaped lower part 2. However, as is additionally shown, such first subregions 12 with a lesser wall thickness b may also be disposed in the cylindrical upper part 4.

The following can be said about the function of the device: The wall of the reactor pressure vessel is structurally developed in such a way that the first subregions 8, 12 provided there fail first if there is a thermal or mechanical overload. One can refer to these first subregions 8, 12 as rated breaking points. In other words, in the generally substantially thicker wall (with the thickness A or B), the first subregions 8, 12 having the lesser wall thickness a and b are distributed spatially. These subregions 8, 12 can also be called "mesh eyelets", or spaces The lesser wall thickness a, b is selected for the loads in rated operation. The "thicker" zones, that is the second subregions 10, 14 having the greater wall thickness A and B, then represent a reinforcement of the vessel wall. This can be considered to be an additional "load-bearing framework".

For the sake of simplicity, only the lower part 2 will be considered below. In the case of local thermal overheating, for instance in the case of being moistened by a falling core melt 30, the thinner wall regions 8, that is the mesh spaces, will fail first. This is because they are heated much more rapidly than the thicker wall of the load-bearing framework, in which a substantially lesser mechanical strain also prevails because of the internal pressure $P_i$.

In the event of a failure, a crack reaching all the way through first arises in the mesh space or first subregion 8. At the existing internal pressure $P_i$ this crack can rapidly spread to the load-bearing framework formed by the two second regions 10. When it reaches them, it is either stopped or deflected. The entire first subregion 8, or in other words the entire area of the mesh space, can then open and fall out. The vessel medium (or coolant such as water vapor, or the liquid core melt 30) can flow out through the thus-formed opening and through other mesh space openings that may also be present. This causes the internal pressure $P_i$ to fall, and as a result further propagation of the vessel failure is in turn stopped. The second regions 10 having the greater wall thickness A accordingly assure that in the event of a crack, the destruction of the vessel wall will proceed relatively slowly. As a result, a reaction surge of high amplitude cannot develop, which in turn means a reduction in the reaction force exerted on the restraint, mounting or fixation of the reactor pressure vessel. It is accordingly important to ensure that a global pressure vessel failure, from ripping off of the entire lower part 2, for instance, will not immediately ensue. Instead, at most, one mesh space after the other can fail, which means a considerable gain in time and thus a lengthening of the time during which the vessel medium flows out.. In this way, the reaction forces that arise can be limited. Even if the reactor pressure vessel rips away from its restraint, mounting or fixation, a threat to the surrounding concrete building should not occur.

In closing, it will also be noted that the provisions according to the invention can in principle be employed with any pressure vessels in which additional safety is to be assured, with examples being gas vessels or containers for the chemical industry.

I claim:

1. A reactor pressure vessel for a nuclear reactor, comprising an upper part and a lower part, said upper and lower parts having an outer surface, at least said lower part having first subregions with a lesser wall thickness and second subregions with a greater wall thickness, said first subregions having said lesser wall thickness being formed by recesses in said outer surface, and said lesser wall thickness being selected for a rated operation.

2. The reactor pressure vessel according to claim 1, wherein each of said recesses has a diameter being approximately in a range of from 0.5 to 2 m.

3. The reactor pressure vessel according to claim 1, wherein said recesses have a rounded inside, in particular being dome-shaped.

4. The reactor pressure vessel according to claim 1, wherein said recessed have a dome-shaped inside.

5. The reactor pressure vessel according to claim 1, wherein said recesses have a symmetrical configuration as seen in the direction of said outer surface.

6. The reactor pressure vessel according to claim 1, wherein said upper and lower parts have an outer surface, and including a ring on said outer surface between said upper and lower parts.

7. The reactor pressure vessel according to claim 1, wherein all of said first subregions have the said size.

8. The reactor pressure vessel according to claim 1, wherein between 8 to 30 of said first subregions with said lesser wall thickness are provided in said lower part.

9. The reactor pressure vessel according to claim 1, wherein said first subregions having said lesser wall thickness are symmetrically distributed.

10. The reactor pressure vessel according to claim 1, wherein said upper part is cylindrical.

11. The reactor pressure vessel according to claim 1, wherein said first subregions having said lesser wall thickness are in said lower part and in said upper part.

12. The reactor pressure vessel according to claim 1, wherein said upper and lower parts are formed of a ferritic steel wall material, said lesser wall thickness in said first subregions is approximately 15 cm, and said greater wall thickness in said second subregion is approximately 25 cm.

* * * * *